United States Patent
Bank et al.

(10) Patent No.: US 11,206,296 B2
(45) Date of Patent: Dec. 21, 2021

(54) NON-CHRONOLOGICAL BUFFERING OF SEGMENTS OF A MEDIA FILE

(71) Applicant: International Business Machines Corporation, Armonk, NY (US)

(72) Inventors: Judith H. Bank, Cary, NC (US); Lisa M. W. Bradley, Cary, NC (US); Lin Sun, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/134,515

(22) Filed: Dec. 28, 2020

(65) Prior Publication Data

US 2021/0120056 A1    Apr. 22, 2021

Related U.S. Application Data

(63) Continuation of application No. 16/543,438, filed on Aug. 16, 2019, now Pat. No. 10,986,151, which is a
(Continued)

(51) Int. Cl.
*G06F 15/16* (2006.01)
*H04L 29/06* (2006.01)
(Continued)

(52) U.S. Cl.
CPC ............ *H04L 65/60* (2013.01); *H04L 65/602* (2013.01); *H04N 21/4331* (2013.01);
(Continued)

(58) Field of Classification Search
USPC ....................................................... 709/219
See application file for complete search history.

(56) References Cited

U.S. PATENT DOCUMENTS 6,233,389 B1    5/2001  Barton
6,701,316 B1 *  3/2004  Li ........................ G06F 16/9574
                                                370/395.41
(Continued)

FOREIGN PATENT DOCUMENTS

CN       1855279 A      11/2006
CN     101110844 A       7/2008
(Continued)

OTHER PUBLICATIONS

"The important part starts at 2:43 into this video ..." [online] Daily Kos, Kos Media, LLC, Jan. 16, 2011 [retrieved Nov. 27, 2012] retrieved from the Internet: <http://www.dailykos.com/story/2011/01/16/936806/-The-important-part-starts-at-2-43-into-this-video>, 28 pgs.
(Continued)

*Primary Examiner* — Anthony Mejia
(74) *Attorney, Agent, or Firm* — Cuenot, Forsythe & Kim, LLC

(57) ABSTRACT

Processing a media file includes receiving a request for a media file from a client system and determining, using a processor, a non-chronological ordering of a plurality of segments of the media file for buffering according to historical playback data for each of the plurality of segments of the media file. A first segment of the media file is sent for buffering to the client system as specified by the non-chronological ordering of the plurality of segments. The non-chronological ordering is determined prior to sending any segment of the media file to the client system.

20 Claims, 4 Drawing Sheets

Related U.S. Application Data continuation of application No. 14/023,534, filed on Sep. 11, 2013, now Pat. No. 10,454,983, which is a continuation of application No. 13/686,275, filed on Nov. 27, 2012, now Pat. No. 10,841,352.

(51) Int. Cl.
| | |
|---|---|
| *H04N 21/472* | (2011.01) |
| *H04N 21/433* | (2011.01) |
| *H04N 21/845* | (2011.01) |
| *H04N 21/61* | (2011.01) |
| *H04L 29/08* | (2006.01) |

(52) U.S. Cl.
CPC ... *H04N 21/47217* (2013.01); *H04N 21/6125* (2013.01); *H04N 21/8456* (2013.01); *H04L 67/2857* (2013.01)

(56) References Cited

U.S. PATENT DOCUMENTS

| | | | | |
|---|---|---|---|---|
| 6,959,320 | B2* | 10/2005 | Shah | G06F 8/65 709/203 |
| 7,284,033 | B2* | 10/2007 | Jhanji | G06Q 30/02 709/204 |
| 7,324,555 | B1 | 1/2008 | Chen | |
| 7,640,353 | B2 | 12/2009 | Shen et al. | |
| 7,650,376 | B1* | 1/2010 | Blumenau | H04L 67/1023 709/203 |
| 7,802,006 | B2 | 9/2010 | Bowra et al. | |
| 7,813,617 | B2 | 10/2010 | Okuyama | |
| 7,840,693 | B2 | 11/2010 | Gupta et al. | |
| 8,849,942 | B1* | 9/2014 | Foster | G09B 29/106 709/213 |
| 8,977,681 | B2* | 3/2015 | Zhu | H04L 67/322 709/203 |
| 8,996,661 | B1* | 3/2015 | Kolam | H04L 67/06 709/219 |
| 9,060,208 | B2* | 6/2015 | Rieger | H04N 21/26241 |
| 9,137,125 | B1* | 9/2015 | Doronichev | H04L 12/189 |
| 9,210,481 | B2 | 12/2015 | Braness | |
| 9,384,297 | B2* | 7/2016 | Graham | G06F 16/957 |
| 9,626,363 | B2* | 4/2017 | Rosenblatt | G06F 16/40 |
| 9,826,057 | B2* | 11/2017 | Agarwal | G06F 16/9535 |
| 10,091,322 | B2* | 10/2018 | O'Donoghue | G06F 9/4451 |
| 10,454,983 | B2 | 10/2019 | Bank et al. | |
| 10,841,352 | B2 | 11/2020 | Bank et al. | |
| 10,986,151 | B2 | 4/2021 | Bank et al. | |
| 2001/0044850 | A1 | 11/2001 | Raz et al. | |
| 2002/0180774 | A1 | 12/2002 | Errico | |
| 2003/0114138 | A1* | 6/2003 | Ramaswamy | H04W 8/22 455/403 |
| 2003/0135631 | A1* | 7/2003 | Li | H04L 29/06027 709/231 |
| 2003/0217116 | A1 | 11/2003 | Currans | |
| 2004/0034712 | A1* | 2/2004 | Rajwan | H04L 1/0083 709/231 |
| 2005/0223107 | A1 | 10/2005 | Mine et al. | |
| 2006/0075019 | A1* | 4/2006 | Donovan | H04L 67/306 709/203 |
| 2006/0268871 | A1 | 11/2006 | Van Zijst | |
| 2007/0094405 | A1 | 4/2007 | Zhang | |
| 2007/0168541 | A1 | 7/2007 | Gupta et al. | |
| 2008/0046584 | A1* | 2/2008 | Tucker | H04N 7/163 709/231 |
| 2008/0084896 | A1* | 4/2008 | Fleury | H04L 65/4084 370/468 |
| 2008/0177994 | A1* | 7/2008 | Mayer | G06F 9/4418 713/2 |
| 2008/0242280 | A1* | 10/2008 | Shapiro | H04N 21/41407 455/414.3 |
| 2008/0289006 | A1 | 11/2008 | Hock | |
| 2009/0024634 | A1 | 1/2009 | Harrang et al. | |
| 2009/0178090 | A1 | 7/2009 | Oztaskent | |
| 2009/0281718 | A1* | 11/2009 | Gibran | G01C 21/3889 701/532 |
| 2009/0307368 | A1* | 12/2009 | Sriram | H04N 21/44004 709/231 |
| 2010/0205628 | A1* | 8/2010 | Davis | H04N 21/41265 725/25 |
| 2010/0238840 | A1* | 9/2010 | Lu | H04W 84/02 370/259 |
| 2010/0293581 | A1 | 11/2010 | Robert | |
| 2010/0299448 | A1 | 11/2010 | Cuoq | |
| 2011/0010421 | A1 | 1/2011 | Chavez | |
| 2011/0106964 | A1 | 5/2011 | Bennett | |
| 2011/0145428 | A1 | 6/2011 | Wei | |
| 2011/0194487 | A1 | 8/2011 | Namburi | |
| 2011/0314145 | A1* | 12/2011 | Raleigh | H04L 43/0882 709/224 |
| 2012/0072611 | A1 | 3/2012 | Kandekar et al. | |
| 2012/0215816 | A1 | 8/2012 | Kidron | |
| 2012/0215903 | A1 | 8/2012 | Fleischman | |
| 2012/0272282 | A1 | 10/2012 | Yang | |
| 2012/0289147 | A1* | 11/2012 | Raleigh | H04N 21/6547 455/3.06 |
| 2012/0302218 | A1* | 11/2012 | Tsuda | H04W 8/18 455/414.1 |
| 2012/0320916 | A1* | 12/2012 | Sebastian | H04N 21/6375 370/390 |
| 2013/0097309 | A1* | 4/2013 | Ma | H04L 67/2847 709/224 |
| 2013/0163667 | A1* | 6/2013 | Nilsson | H04N 21/44004 375/240.12 |
| 2013/0275685 | A1* | 10/2013 | Barbas | G06F 16/24552 711/137 |
| 2013/0282890 | A1* | 10/2013 | Ma | G06F 16/24568 709/224 |
| 2013/0332297 | A1* | 12/2013 | Forutanpour | G01C 21/3461 705/26.1 |
| 2014/0067257 | A1* | 3/2014 | Dave | G01C 21/3453 701/423 |
| 2014/0149553 | A1 | 5/2014 | Bank et al. | |
| 2014/0149555 | A1 | 5/2014 | Bank et al. | |
| 2015/0006731 | A1* | 1/2015 | Ren | H04L 47/826 709/226 |
| 2015/0113156 | A1* | 4/2015 | Smith | H04L 65/605 709/231 |
| 2015/0120876 | A1* | 4/2015 | Parthasarathy | H04L 65/60 709/219 |
| 2015/0229713 | A1* | 8/2015 | Lu | H04W 52/0261 709/203 |
| 2015/0341812 | A1 | 11/2015 | Dion | |
| 2017/0085611 | A1* | 3/2017 | Barker | H04N 21/47202 |
| 2019/0373037 | A1 | 12/2019 | Bank et al. | |
| 2020/0014486 | A1* | 1/2020 | Harrang | H04L 65/80 |

FOREIGN PATENT DOCUMENTS

| | | |
|---|---|---|
| CN | 101217638 A | 7/2008 |
| CN | 101447994 A | 6/2009 |
| CN | 101471919 A | 7/2009 |
| CN | 101605242 A | 12/2009 |
| CN | 102447973 A | 5/2012 |
| CN | 102546716 A | 7/2012 |
| CN | 103841429 A | 6/2014 |

OTHER PUBLICATIONS

U.S. Appl. No. 13/686,275, Non-Final Office Action dated Sep. 18, 2014, 21 pg.
U.S. Appl. No. 13/686,275, Non-Final Office Action dated Sep. 21, 2015, 26 pg.
U.S. Appl. No. 13/686,275, Final Office Action, dated Feb. 23, 2016, 28 pg.
U.S. Appl. No. 13/686,275, Non-Final Office Action dated Dec. 14, 2016, 26 pg.
U.S. Appl. No. 13/686,275, Final Office Action, dated Jun. 14, 2017, 25 pg.

(56) References Cited

OTHER PUBLICATIONS

U.S. Appl. No. 13/686,275, Examiner's Answer, dated Apr. 20, 2018, 21 pg.
U.S. Appl. No. 14/023,534, Non-Final Office Action dated Oct. 1, 2014, 16 pg.
U.S. Appl. No. 14/023,534, Non-Final Office Action dated Sep. 22, 2015, 17 pg.
U.S. Appl. No. 14/023,534, Final Office Action, dated Feb. 23, 2016, 22 pg.
U.S. Appl. No. 14/023,534, Non-Final Office Action dated Dec. 14, 2016, 20 pg.
U.S. Appl. No. 14/023,534, Final Office Action, dated Jun. 14, 2017, 19 pg.
U.S. Appl. No. 14/023,534, Examiner's Answer, dated Apr. 20, 2018, 17 pg.
U.S. Appl. No. 14/023,534, Decision on Appeal, May 16, 2019, 8 pg.
U.S. Appl. No. 14/023,534, Notice of Allowance, dated Jun. 10, 2019, 7 pg.
U.S. Appl. No. 13/686,275, Decision on Appeal, Jun. 26, 2020, 17 pg.
U.S. Appl. No. 13/686,275, Notice of Allowance; dated Aug. 14, 2020, 8 pg.
U.S. Appl. No. 16/543,438 Non-Final Office Action, dated Nov. 17, 2020, 6 pg.
U.S. Appl. No. 16/543,438 Notice of Allowance, dated Dec. 15, 2020, 8 pg.

* cited by examiner

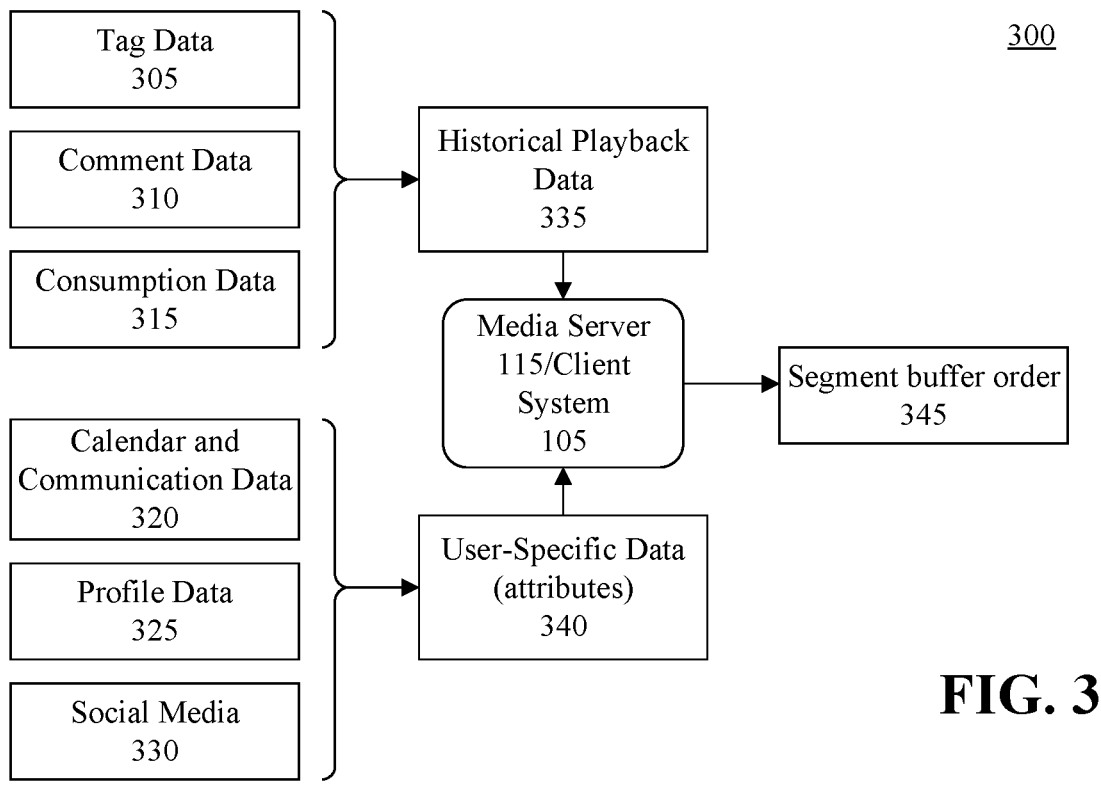

FIG. 3

| Segment | Time | Statistical Information |
|---|---|---|
| 1 | 0-1 | Introduction; 40% watched from 0 to 20 seconds; 50% watched from 20 seconds to 1 minute; 76% of viewers liked. |
| 2 | 1-2 | Topic 1; 90% of social network watched; 70% of all watched; 40% liked, 20% loved, 10% disliked. |
| 3 | 2-3 | Topic 2; 100% of social network watched; 95% of all watched; 73% liked, 5% enjoyed. |
| 4 | 3-4 | Topic 3; 20% of social network watched; 50% of all watched; 23% enjoyed, 14% indifferent. |
| 5 | 4-5 | Summary; 80% of social network watched; 98% of all watched; 13% found redundant. |
| 6 | 5-6 | Credits; 95% of users watching stopped watching at 5:10; 90% did not comment. |

FIG. 4

NON-CHRONOLOGICAL BUFFERING OF SEGMENTS OF A MEDIA FILE

BACKGROUND

When a client system accesses a media file over a network such as the Internet, the media file typically is buffered. The media file is buffered in a chronological order that starts by buffering from the beginning of the media file. For example, when attempting to view a video media file or listen to an audio media file, a portion of the media file is buffered within the client system. The portion that is buffered is the start of the media file and, more particularly, the first several seconds of playback material from the media file.

When a user using the client system wishes to skip through the media file to a particular location of interest, the buffered portion of the media file is rendered useless as the user has likely skipped over the buffered portion of the media file. In consequence, the user experiences a delay in resuming playback from the newly selected location in the media file.

BRIEF SUMMARY

A method includes receiving a request for a media file from a client system and determining, using a processor, a non-chronological ordering of a plurality of segments of the media file for buffering according to historical playback data for each of the plurality of segments of the media file. The method further includes sending a first segment of the media file, as specified by the non-chronological ordering of the plurality of segments, for buffering to the client system. The non-chronological ordering is determined prior to sending any segment of the media file to the client system.

Another method includes including, using a processor, a reference to a media file within a Web page, wherein the media file has a plurality of segments, and including, within the reference, a parameter indicating that segments of the media file are to be buffered in a non-chronological order.

A system includes a processor programmed to initiate executable operations. The executable operations include receiving a request for a media file from a client system and determining a non-chronological ordering of a plurality of segments of the media file for buffering according to historical playback data for each of the plurality of segments of the media file. The executable operations also include sending a first segment of the media file, as specified by the non-chronological ordering of the plurality of segments, for buffering to the client system. The non-chronological ordering is determined prior to sending any segment of the media file to the client system.

Another system includes a processor programmed to initiate executable operations. The executable operations include including a reference to a media file within a Web page, wherein the media file has a plurality of segments, and including, within the reference, a parameter indicating that segments of the media file are to be buffered in a non-chronological order.

A computer program product includes a computer readable storage medium having program code embodied therewith. The program code is executable by a processor to perform a method. The method includes receiving, using a processor, a request for a media file from a client system and determining, using the processor, a non-chronological ordering of a plurality of segments of the media file for buffering according to historical playback data for each of the plurality of segments of the media file. The method further includes sending, using the processor, a first segment of the media file, as specified by the non-chronological ordering of the plurality of segments, for buffering to the client system. The non-chronological ordering is determined prior to sending any segment of the media file to the client system.

BRIEF DESCRIPTION OF THE SEVERAL VIEWS OF THE DRAWINGS

FIG. 3 is a block diagram illustrating an example of a processing technique for deriving historical playback data and user-specific data.

FIG. 4 is a table illustrating an example of historical playback data for a media file.

DETAILED DESCRIPTION

Figure 1:
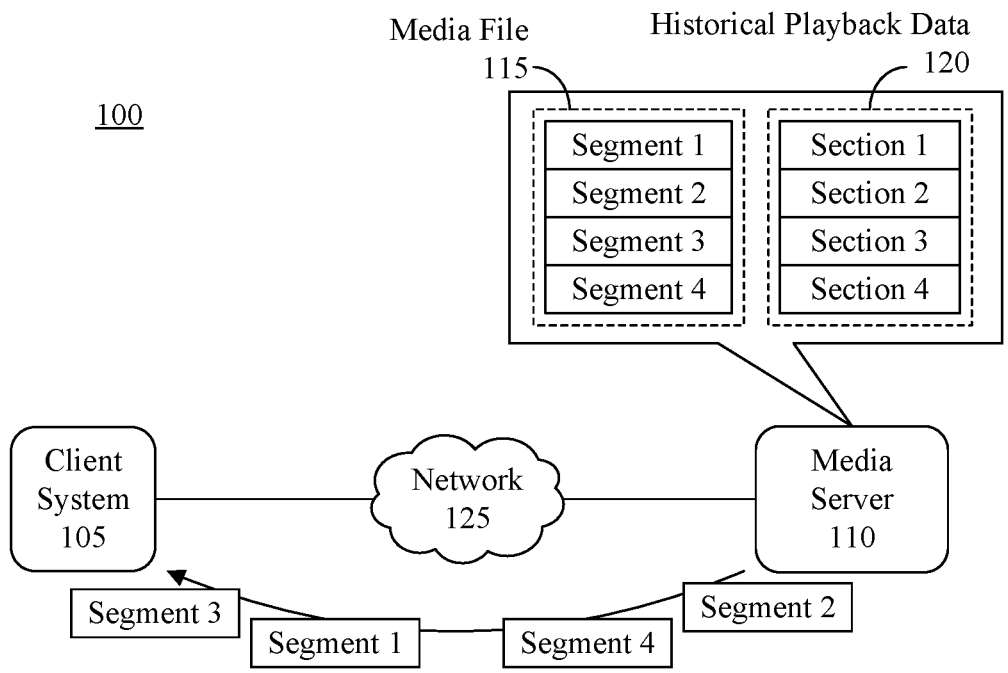
FIG. 1 is an exemplary computing environment for playback of media files.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

One or more embodiments disclosed within this specification relate to buffering media files. More particularly, one or more embodiments relate to buffering portions of a media file for the purpose of playback in an order that is not chronological. In accordance with the inventive arrangements disclosed within this specification, historical playback data for a media file can be processed to determine, e.g., predict, the segments of the media file that are of interest to a user. The segments can be ordered according to the level of user interest for each segment based, at least in part, upon the historical playback data for the media file. The segments then are buffered, e.g., sent, to a client system in the non-chronological order that is determined.

FIG. 1 is an exemplary computing environment 100 for playback of media files. Computing environment 100 includes a client system 105 communicatively linked with a media server 110 through a network 125. Each of client system 105 and media server 110 is implemented as a data processing system executing suitable operational software, e.g., program code. The program code, when executed, programs each respective data processing system to perform, or initiate, the various functions and/or operations described within this specification. Network 125 can be implemented as, or include, any of a variety of different networks such as a WAN, a LAN, a wireless network, a mobile network, a Virtual Private Network (VPN), the Internet, or the like.

As pictured in FIG. 1, media server 110 is configured to provide a media file 115 to client system 105 through network 125. A "media file" refers to digitized audio, digitized video, digitized audiovisual content, or the like that is digitally stored as a file within a data storage device. Media file 115 includes two or more different segments denoted as segments 1, 2, 3, and 4 within FIG. 1. The particular number of segments of media file 115 is not intended as a limitation of the embodiments disclosed within this specification. In one aspect, segments are static. In another aspect, segments are dynamically determined. In any case, media file 115 is associated with historical playback data 120. In one aspect, historical playback data 120 is implemented as metadata for media file 115.

Historical playback data 120 is illustrated as being separate from media file 115. In one aspect, the historical playback data for a media file can be stored separately from the media file, e.g., in a database or other file and/or data structure as illustrated in FIG. 1. In another aspect, however, one or more or all of the portions of historical playback data 120 can be stored within, or as part of, media file 115.

Historical playback data 120 specifies information for each of the various segments, i.e., segments 1-4, of media file 115. In illustration, and as pictured in FIG. 1, historical playback data 115 includes different sections denoted as sections 1-4. Section 1 of historical playback data 120 specifies historical playback data for segment 1 of media file 115. Section 2 specifies historical playback data for segment 2. Section 3 specifies historical playback data for segment 3. Section 4 specifies historical playback data for segment 4.

Historical playback data 120 can specify a variety of different types of information relating to media file 115. Historical playback data 120 can be specified on a per-segment basis. In one example, historical playback data 120 includes consumption data. Consumption data indicates how users consumed, e.g., viewed or listened to, media file 115. Consumption data can be specified as statistical information and can indicate, for example, which users viewed a given segment of media file 115, which users skipped (e.g., did not view) a given segment of media file 115, where users stopped consuming (e.g., viewing or listening to) a particular segment of media file 115, where users started fast forwarding within a segment of media file 115, stopped fast forwarding within a segment of media file 115, which segments of media file 115 were viewed more than one time, or the like.

In another example, historical playback data 120 includes sentiment indicators such as whether each user "liked," "disliked," "enjoyed," particular segments. The sentiment indicators further can specify that users had no comment for a given segment. In still another example, the historical playback data includes keywords indicating the content or subject matter of media file 115. The keywords can be implemented as a tag or tagging system in which one or more keywords are associated with media file 115 and/or one or more segments thereof.

Historical playback data 120 can be aggregated across a plurality of different users, across all users, only across particular user groups, etc. In one example, historical playback data 120 can include data for many users across groups, but can be filtered according to particular groups and/or subgroups. In another example, historical playback data 120 can be filtered so that only the playback information of users in the same social network as the user of client system 105 is considered. The user of client system 105, e.g., the client system requesting media file 115, is referred to from time to time within this specification as the "requesting user." In any case, the various examples of historical playback data 120 discussed can be specified on a per-segment basis. Historical playback data 120 and the use thereof is described in further detail with reference to the remaining figures within this specification.

In the example pictured in FIG. 1, media server 110 performs an analysis upon historical playback data 120 for each of segments 1-4 of media file 115. In one aspect, one or more attributes relating to client system 105, e.g., the user of client system 105, are incorporated into the analysis of historical playback data 120. The term "user" refers to a human being operating a data processing system such as client system 105. Responsive to the analysis, media server 110 determines an order of the segments 1-4 to be provided to client system 105 for purposes of buffering.

The term "buffering" refers to preloading data into a memory (e.g., a buffer) of a data processing system. When streaming media file 115 from media server 110 to client system 105, for example, buffering refers to downloading a certain amount of media file 115. In one aspect, one or more segments of media file 115 are downloaded to client system 105 prior to playing any portion of media file 115 within, or by, client system 105. Having an advance supply of segments or portions of segments, e.g., audio samples in the case of an audio media file or video frames in the case of a video media file, in memory at all times prevents disruption if there are momentary delays in transmission while media file 115 is being played.

The term "streaming" refers to a technology in which media file 115 can be played by client system 105 while media file 115 is still being provided by media server 110. A media file that is streamed can be constantly received by, and presented to, a user while the media file is still being delivered from a provider such as media server 110. As such, client system 105 can begin playback of media file 115 prior to the end of media file 115 being received from media server 110.

Conventional systems buffer portions of a media file in chronological order. The segments are downloaded to the client system in order, e.g., first segment 1, followed by segment 2, followed by segment 3, followed by segment 4 as the client system continues to play the media file. Within each segment, the samples provided also are provided to the client system in chronological order, which presumes the end user will playback the media file from start to finish without deviating from the chronological order of the material (e.g., the natural timeline of the media file). The chronological ordering of portions of the media file for buffering presumes a user will not use functions such as fast forward or otherwise attempt to skip ahead to a different portion of the media file. In effect, chronological buffering presumes uninterrupted and continuous playing of the media file from start to finish, which effectively orders the segments chronologically 1-4 for buffering.

Referring to FIG. 1, media server 110 has determined a different order for segments 1-4 to be buffered that is not chronological. The order is: segment 3, segment 1, segment 4, and segment 2. Media server 110 sends segments of media file 115 to client system 105 in the determined order, which is not chronological. The order of segments that are buffered is one that sends the segment predicted to be of greatest interest to the user first, followed by the segment that is predicted to be of second greatest interest to the user, and so on according to decreasing level of interest. In one aspect, the predictions of user interest in segments and ranking of segments according to levels of user interest are based upon historical playback data 120. In another aspect, the predictions are based upon historical playback data 120 in combination with user-specific data, e.g., user and/or client system attributes, to be discussed herein in greater detail.

Figure 2:
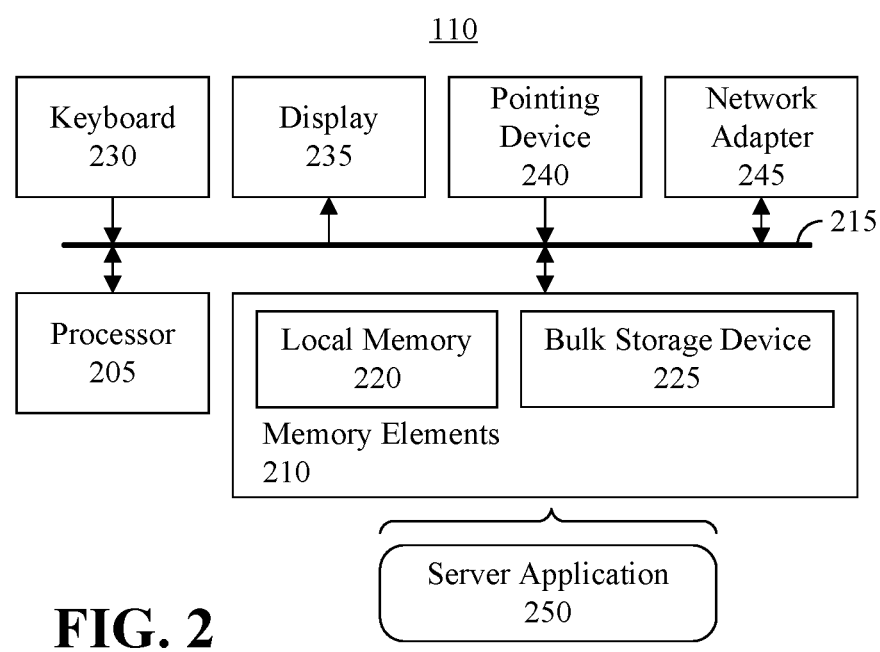
FIG. 2 is an exemplary implementation of a media server illustrated in FIG. 1.

FIG. 2 is an exemplary implementation of media server 110 of FIG. 1. Media server 110 includes at least one processor (e.g., a central processing unit) 205 coupled to memory elements 210 through a system bus 215 or other suitable circuitry. As such, media server 110 can store program code within memory elements 210. Processor 205 executes the program code accessed from memory elements 210 via system bus 215. In one aspect, for example, media server 110 is implemented as a computer or other programmable data processing apparatus that is suitable for storing and/or executing program code. It should be appreciated, however, that media server 110 can be implemented in the form of any system including a processor and memory that is capable of performing and/or initiating the functions and/or operations described within this specification.

Memory elements 210 can include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as an HDD, an SSD, or other persistent data storage devices. Media server 110 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to media server 110. The I/O devices can be coupled to media server 110 either directly or through intervening I/O controllers. One or more network adapters 245 also can be coupled to media server 110 to enable media server 110 to become coupled to other systems, computer systems, remote printers, and/or remote storage devices through intervening private or public networks. Modems, cable modems, and Ethernet cards are examples of different types of network adapters 245 that can be used with media server 110.

As pictured in FIG. 2, memory elements 210 store a server application 250 and appropriate operational software (e.g., an operating system—not shown). Server application 250, being implemented in the form of executable program code, is executed by media server 110 and, as such, is considered an integrated part of media server 110. For purposes of illustration, server application 250 is depicted as a single application. It should be appreciated, however, that server application 250 can be formed of one or more components or application programs that operate cooperatively to provide the functionality described within this specification.

Server application 250, when executed by media server 110, programs media server 110 to analyze historical playback data associated with one or more media files and determine an order, e.g., a non-chronological order, of segments of the media file to be buffered. Media server 110 then sends the segments to a client system for buffering in the determined, non-chronological order. As such, server application 250, the historical playback data, and any other attributes used in analyzing the historical playback data relating to the client system are functional data structures that impart functionality when employed as part of media server 110.

While the architecture of FIG. 2 is described as an exemplary implementation of media server 110, the architecture also can be utilized to implement client system 105. Client system 105, however, can have any of a variety of different form factors such as, for example, a portable computing device such as an Internet-enabled mobile phone or mobile communication device, a laptop computer, a desktop computer, a tablet computing device, or the like.

When the architecture of FIG. 2 is used to implement client system 105, the program code contained therein and executed will be a client operating system and one or more client applications such as a browser, a plug-in, etc., operating cooperatively with one another. Accordingly, any client application, historical playback, and/or user-specific data used in determining a segment ordering are functional data structures that impart functionality when employed as part of client system 105.

FIG. 3 is a block diagram illustrating an example of a processing technique to derive historical playback data 335 and user-specific data 340. As pictured, one or more data sources are shown. The data sources include tag data 305, comment data 310, consumption data 315, calendar and communication data 320, profile data 325, and social media 330.

In general, tag data 305, comment data 310, and consumption data 315 are processed, e.g., aggregated and/or analyzed, to form historical playback data 335. As such, each of tag data 305, comment data 310, and consumption data 315 are media file specific and, with regard to a particular media file, segment specific.

Tag data 305 includes one or more tags. Each tag is associated with a particular media file in general or a particular segment of a particular media file. A "tag" refers to a non-hierarchical keyword or term that is assigned to a piece of information such as a segment of a media file. A tag, which is a form of metadata, helps describe the item to which the tag is assigned. As discussed, a tag can be a keyword that describes the subject matter or content of the item to which the tag is associated. Accordingly, one or more tags can be applied on a per-media file and/or per-segment basis, for example, by various users. Tagging provides another dimension to the statistical data in that the media server can filter the statistical data, which can include tags, across all users, some users, etc.

As part of tag data 305, each tag for a given media file and/or segment further can be associated with the particular user that assigned the tag. This allows tags to be associated with particular users, user groups, or the like. In another aspect, each tag can be associated with a particular time or location within the media file or a particular span of time. The time and/or span of time may or may not have the same start and end time as a segment.

Comment data 310 includes one or more textual comments that have been associated with a particular media file and/or segment of a media file. A comment can be manually entered by a user, for example, by way of the media player of the client system through which a user consumes a media file. In another aspect, a comment can be provided through a social network including, for example, a blog, a tweet, an entry on a personal social network page, or the like. In one example, the comment can be explicitly provided, e.g., as a like or dislike type of sentiment indicator through an interface providing such functionality. In another example, sentiment indicators can be derived from a contextual analysis of the text of a comment.

Consumption data 315, as discussed, specifies how each media file and/or segment thereof has been played by one or more other users.

Tag data 305, comment data 310, and consumption data 315 can be processed across users, user groups, and media files to form historical playback data 335. In one aspect, historical playback data 335 is aggregated and processed by the media server. In another aspect, one or more other systems can aggregate and process historical playback data 335 and make such data available to the media server.

In general, calendar and communication data 320, profile data 325, and social media 330 are aggregated to form user-specific data 340, also referred to herein as an "attribute" or as "attributes" for a requesting user and/or a client system of a requesting user. Calendar and communication data 320 can include information taken from a user's calendar such as past and/or future meetings, events, tasks, etc. Calendar and communication data 320 further can include electronic mail messages, text and/or instant messages, etc. Other forms of data as managed by a personal information management system also can be included. The various forms of data can be processed using a contextual analysis to apply tags, determine sentiment indicators, or the like.

Profile data 325 refers to a profile for the requesting user. The profile can specify information such as, for example, a user's role within an organization, the user's job title, one or more preferences relating to subject matter of interest or expertise, etc. Social media 330 refers to posts, tweets, and other information that can be obtained from one or more social networks to which a user may belong. In one example, the user can store credentials for one or more social networks within profile data 325. The particular data processing system that is tasked with aggregating user-specific data and/or historical playback data can access the social networks to obtain blog posts, tweets, and other information for the requesting user.

In another example, the stored credentials can be used to obtain other information such as tags (tag data 305), comments (comment data 310), and/or consumption data 315 from other users within the social networks to which the user belongs. In this manner, historical playback data 335 can be further processed according to groups or social networks to which a user belongs as opposed to being viewed generically across all users.

In one aspect, information such as calendar and communication data 320, profile data 325, and/or social media 330 can be collected for the requesting user asynchronously by the client system through which the user is working, e.g., by the particular client-side program executed to play the requested media file. In this manner, the client system can maintain connections to one or more other systems such as calendar systems, social networking sites, etc. to collect the aforementioned types of data. The data can be stored locally within the client system and/or shared with the media server as may be required for determining an order of segments of a media file and/or for determining a segmentation of a media file.

A data processing system such as media server 115 and/or client system 105 generates segment buffer order 345. In one aspect, the data processing system (whether media server 115 or client system 105) processes historical playback data 335 to generate segment buffer order 345 for a requested media file. Such analysis can be performed without regard for any user-specific data 340 relating to the requesting user. In another aspect, the data processing system processes historical playback data 335 in combination with user-specific data 340 to generate segment buffer order 345 for a requested media file.

In using both historical playback data 335 and user-specific data 340, the data processing system can match interests of the user that is requesting the media file with interests of other users having consumed the requested media file. Information such as job title, past meetings, electronic mail, subjects (e.g., subjects derived from past meetings, communications, tasks, tweets, posts, etc.) can be compared with segment-specific tag data and segment specific comment data from other users having consumed the requested media file.

For example, the segment of the requested media file having a largest number of items of historical playback data in common with the requesting user indicates that the requesting user will likely have a highest level of interest in the segment and likely wish to view the segment first. In that case, segment buffer order 345 will indicate that the segment with the highest number of matching items of historical playback data is to be buffered first.

In another example, the data processing system can determine segments of greatest interest to the user by selecting topics that are often mentioned in communications of the user such as blogs, electronic mail, texts, etc. and are favorably regarded by the user based on a contextual analysis of such communication content. A similar process can be undertaken regarding social networking data and which can additionally incorporate sentiment indicators, whether explicitly defined or determined through a contextual analysis of text comments and/or other communications.

FIG. 4 is a table illustrating an example of historical playback data 400 for a media file. Historical playback data 400 is illustrated in tabular form for purposes of illustration, but can be stored using any of a variety of different formats and/or data structures. Within FIG. 4, each row corresponds to a section of historical playback data 400. As noted, each section is associated with a segment of the media file to which historical playback data 400 is associated.

In the example pictured in FIG. 4, the media file described by historical playback data 400 includes 6 segments denoted as segments 1-6. The first column indicates the particular segment to which the row of historical playback data 400 corresponds. The time for each segment of the media file is specified in the second column. For purposes of illustration, it can be assumed that the times are specified in minutes, but can be specified in seconds, a combination of minutes and seconds, or using another time reference. In general, the segments are specified by a starting time and an ending time for each segment. Referring to FIG. 4, the first segment starts at time 0 and ends at 1 minute. The second segment starts at 1 minute and ends at 2 minutes, etc. The entirety of the media file, which includes all six segments, runs from time 0 to 6 minutes.

The third column includes statistical information relating to playback for each segment of the media file. While grouped in a single column, it should be appreciated that the various items of statistical information can be separated into individual columns or fields as the case may be for purposes of storage and/or analysis depending upon the file and/or data structure used. The representation provided in FIG. 4 is not intended as a limitation in this regard.

The statistical information is specified in a per segment basis. In one example, the segments can be predetermined, e.g., by the author of the media file or another third party. As illustrated, the segments can be equal time intervals. In another aspect, segments can have different time intervals. For example, the first segment can be 40 seconds, while the second segment can be two minutes. In another example, segments can be determined according to subject matter, where each segment corresponds to a different topic, an introduction, a closing, closing credits, etc.

The statistical information pictured in FIG. 4 includes historical playback data for all users that access the media file and/or for one or more specific groups. In the example shown, the statistical information includes the historical playback data for a particular social network to which the requesting user belongs. For example, as part of the request for the media file, the request can specify an attribute that identifies the user. From the identity of the user, the media server can determine one or more groups, e.g., a social network, to which the user belongs. The statistical information can be sorted or filtered based upon the group or social network of the user. Accordingly, when filtered, only statistical information for other users belonging to the same group, e.g., social network, as the user of the client system is considered when determining interest of the requesting user.

In illustration, in one aspect the ordering of segments of the media file to be buffered is determined according to historical playback data for the social network to which the requesting user belongs. In such an example, the media server would select a segment order as follows: segment 3; segment 2, segment 5; segment 4; segment 1; and segment 6. The order determined by the media server does not follow a chronological order, but rather a predicted order based upon which segments were viewed by members of the social network of the requesting user. Since 100% of members of the social network of the user watched segment 3, segment 3 is the first segment sent for buffering. The next most watched segment of the media file by members of the social network of the user is segment 2 at 90%, followed by segment 5 at 80%, etc. No members of the requesting user's social network watched segment 1 or segment 6. The remaining data suggests that segment 6 was less popular than segment 1 since users stopped viewing segment 6, thereby placing segment 6 last.

In another aspect, the segments of the media file are ordered for buffering according to historical playback data across two or more groups of users or all users as opposed to just members of the same social network as the requesting user. In that case, the order of segments still is not likely to be chronological, but may differ from the order determined when considering only members of the same social network of the user requesting the media file. For example, when considering statistical information for all users, the first segment of the media file sent for buffering is segment 5 which was watched by 98% of all users. The next segment sent for buffering is segment 3, which was watched by 95% of all users, followed by segment 2, etc.

In still another aspect, the order of segments determined by the media server can be calculated according to a mix of historical playback data for selected groups, members of the social network of the requesting user, and all users. For example, the percentage of users of a social network or other group viewing a segment can be multiplied by a weighting factor, as can the percentage of all users all users viewing the segment. The weighting factors can be different. The two products can be summed to determine an overall score indicating a level of interest by the requesting user for each segment. The highest scoring segment is determined by the media server to be the segment of highest interest and is the first to be buffered, followed by the segment with the second highest score, etc.

In another aspect, the segments of the media file can be ordered according to a formula that depends upon the number of users viewing at least a portion of the media file and the sentiment expressed by the users on a per-segment basis. The sum of the percentage of users consuming (or having consumed) the segment plus the percentage of user expressing a positive sentiment for the segment can be summed. Referring to FIG. 3, segment 2 would be buffered first because 95% watched and 73% liked +5% enjoyed. This would mean that segment 2 had a rating of 173 (95+73+5).

Referring to segment 6, the statistical information indicating that users stopped watching the video segment after only 10 seconds can be used as an indicator that the user is not likely to view the segment thereby causing the segment to be placed toward the end, or at the end, of the order of segments for buffering. In addition, the fact that segment 6 had no comments can be used to reduce the score of the segment. The lack of comments is interpreted to mean that segment 6 was considered less interesting to others and, as such, to the requesting user.

As discussed, historical playback data 300 can include one or more tags. In one aspect, only tags from one or more specific other users or other users designated as having a same expertise as the user requesting the media file can be considered. When the media file has a segment that has a tag that is common to a profile of the requesting user, the media server can determine that the user has a high level of interest in that segment.

FIG. 4 illustrates various segments of the media file and corresponding sections of historical playback data. In one aspect, the segments can be determined and maintained in a static manner. In that case, for example, the same segmentation of the media file is used for each different user that requests the media file.

In another aspect, segmentation of the media file can be dynamically determined. In one example, the segmentation of the media file is performed based upon the historical playback data. In illustration, each item of historical playback data can be associated with a start and an end time. For example, each tag or attribute can be associated with its own start and end time thereby allowing the media server to determine a segmentation of the media file for purposes of buffering using the historical playback data. By determining portions of the media file associated with items of historical playback data with similar or same start and end times or discontinuities in the historical playback data, a segmentation of the media file can be determined. The historical playback data can be partitioned across the resulting segmentation.

In illustration, consider an example in which 40% of all users watched from 0 to 20 seconds and 50% of all users watched from 20 seconds to 1 minute. A segment can be formed from 0 to 20 seconds and another segment from 20 seconds to 1 minute. The difference between viewing statistics, or items of historical playback data, whether tags, comments, consumption data, etc., can be used as a segment boundary. In this example, the boundary is a difference in viewing across all users from 40% to 50% results in a segment boundary. Thus, both the length and the number of segments of the media file can vary.

In another example, segmentation of the media file is dynamic and user-specific. In that case, the particular segments, e.g., length and number, will vary according to the particular user that requests the media file and a comparison of the user-specific data with the historical playback data. As noted, items of historical playback data can be associated with start and end times as opposed to predetermined segments.

In illustration consider the case in which 40% of the members of the social network of the requesting user watched from 0 to 20 seconds and 50% from 20 seconds to 1 minute. A segment can be formed from 0 to 20 and another from 20 seconds to 1 minute. In this example, the change in percentage of viewing users within the same social network as the requesting user is used as the boundary between two segments. Thus, like the previous example, both the length and the number of segments of the media file can vary.

Figure 5:
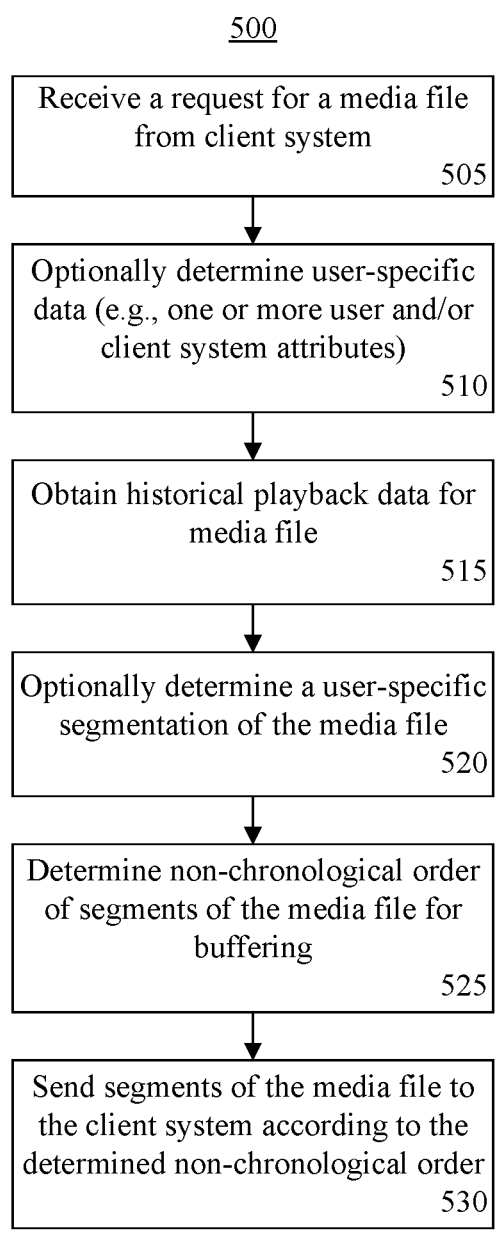
FIG. 5 is a flow chart illustrating an exemplary method of processing a media file.

FIG. 5 flow chart illustrating an exemplary method 500 of processing a media file for streaming. Method 500 can be implemented by the media server described with reference to FIGS. 1 and 2 of this specification. Method 500 can begin in a state where historical playback data for one or more media files is collected from a variety of sources and stored in association with the media file(s).

In block 505, the media server receives a request for a media file from the client system. A user working through the client system, for example, can select a link, e.g., a hyperlink, for a particular media file or a Web page having a media file included or referenced therein. A "Web page" refers to one or more files that are rendered, e.g., displayed, by a browser executing in the client system. A Web page typically is formatted as a markup language such as HyperText Markup Language (HTML), but can be formatted using other markup languages, reference other programmatic components, etc.

In block 510, the media server optionally determines user-specific data (e.g., one or more attributes relating to the user of the client system and/or the client system). In one aspect, the media server obtains one or more attributes that may be received as part of the request received from the client system. The request can include, for example, an identifier indicating the identity of the requesting user operating the client system. Any of the items of user-specific data discussed within this specification can be obtained and included within such a request.

In another aspect, the client system of the requesting user can aggregate user-specific data asynchronously during operation. The data can be sent to the media server from time-to-time, periodically, or the like. Responsive to a request from the user, the user-specific data that was previously sent can be recalled for use in ordering segments of the requesting media file for buffering.

In block 515, the media server obtains historical playback data for the media file. The media server accesses historical playback data as described with reference to FIGS. 1, 3, and 4 within this specification. As noted, the historical playback data is obtained from one or more different sources.

In block 520, the media server optionally determines a segmentation of the media file. The segmentation is performed dynamically responsive to the request for the media file. The segmentation may or may not be user-specific as previously described. In the event that block 520 is not performed, a default or predetermined segmentation of the requested media file exists and is used.

In block 525, the media server determines an order of segments of the requested media file for buffering. The order that is determined is a non-chronological order in which the segments, as predicted by the media server, to be of highest interest to the requesting user are provided first. In one aspect, the non-chronological ordering is determined prior to sending any segment of the media file. For example, the non-chronological ordering is determined (and subsequently followed) prior to sending a beginning of the media file for playback.

In one aspect, the order that is determined is based upon historical playback data without regard to the identity of the user or any other attribute that may be determined from the received request from the client system. For example, the non-chronological order is determined according to playback data for a majority of the users that have played the media file.

In another aspect, the order that is determined is based upon historical playback data while including the attribute(s) determined from the request. For example, as discussed, the identity of the user can be determined. The identity can be used to determine the social network to which the user belongs, other groups to which the user belongs, tags associated with the user, etc. The historical playback data can be filtered to only include historical playback data for the media file determined from members of the social network of the user from which the request was received or historical playback data for the media file determined from other users belonging to the same group.

In another example, the media server can determine segments of interest by identifying segments viewed by others that are associated with similar or same tags as the requesting user, or segments having tags that have been previously identified by the requesting user to be of particular interest. The greater the number of matching tags, the higher the predicted level of user interest in the segment. As noted, an algorithmic approach can be used that weights the statistical playback data with tags to calculate a predicted level of interest by the user for the segments. A segment predicted to be of greatest interest is ordered first for buffering as noted.

It should be appreciated that any of the various techniques described within this specification for scoring segments and/or determining levels of user interest can be used to order the segments for purposes of buffering.

In block 530, the media server sends the segments of the media file to the client system in the order determined in block 525. As noted, the order is non-chronological. In one aspect, the determination of the ordering of the segments for buffering and the sending of segments in accordance with that determined ordering is performed without the client system starting playback of the media file. Because playback of the media file is not necessary for implementation of the techniques described within this specification, the order that is determined for the segments can begin with a segment other than the first segment of the media file. The media server can send, or begin sending, segments for buffering in accordance with the non-chronological order without the client system beginning playback or requesting playback.

Figure 6:
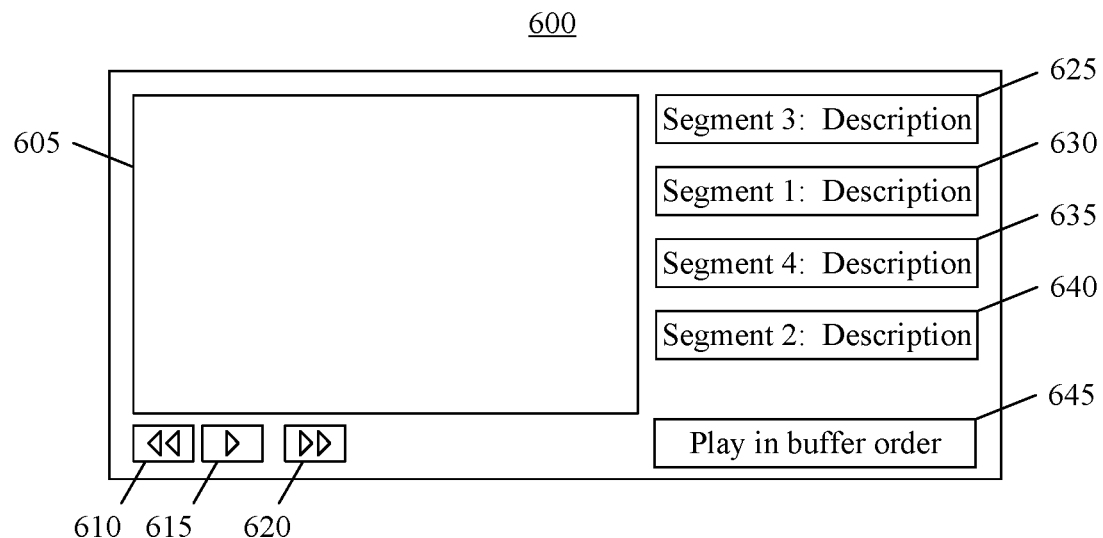
FIG. 6 is a block diagram illustrating an exemplary user interface for playback of a media file.

FIG. 6 is a block diagram illustrating an exemplary user interface (UI) 600 for playback of a media file. UI 600, as shown, is graphical in nature and can be used within a client system. UI 600 can include a window 605 for playback of visual content of the media file. UI 600 further can include one or more controls such as a rewind control 610, a play control 615, and a fast forward control 620.

Along the right portion, UI 600 includes several indicators 625, 630, 635, and 640. In one aspect, an indicator is provided for each segment of the media file that is requested. In another aspect, an indicator for the first "N" segments that are buffered, where "N" is an integer value. Indicators 625-640 each specifies a particular segment of the media file. The ordering of the segments corresponds to the order in which segments of the media file are sent to the client system for buffering. In this example, the segments of the media file are buffered in the following order: segment 3, followed by segment 1, followed by segment 4, followed by segment 2. In one aspect, a user can select a segment, e.g., by selecting the corresponding one of the indicators 625-640, to begin playback allowing the user to selectively playback different portions of the media file as determined and with the aid of the presented ordering as determined by the media server.

FIG. 6 is provided for purposes of illustration and is not intended as a limitation of the one or more embodiments disclosed herein. In another aspect, each of indicators 625-640 can include description of the content of each respective segment. The description can include one or more items of historical playback data such as the subject or tag for each segment, consumption information whether across all users or for particular groups and/or social networks. The description further can include one or more thumbnails or images of the media file illustrating content. The description allows the requesting user to determine the subject matter of a segment.

FIG. 6 further includes a control 645. In the event that playback of the requested media file does not start playback automatically, selection of control 645 causes the media file to begin playback according to the order in which segments are buffered. Accordingly, media file will play segments in the following order: segment 3, segment 1, segment 4, then segment 2. While control 645 is provided, in another aspect, playback according to the buffer order can be set as the default. Further playback can begin automatically.

In another aspect, an order of segments of a media file can be specified directly within the request provided for the media file. As an illustration, consider a Web page that references a link, i.e., a hyperlink, for a media file. A parameter can be included with the link that facilitates the specification of an ordering of segments to be buffered for the media file. For example, a parameter such as "&buffer" can be provided as a query string parameter.

In one aspect, the parameter can be specified as "&buffer=bufferArray". The array "bufferArray" can be specified according to the following format:

bufferArray=<0,20,120,180,60,120,240,300,300,310, 20,60,310,360>

The values indicate that the first segment of the media file to be buffered is second 0 to second 20. The next segment of the media file to be buffered is from second 120 to second 180. The subsequent segments to be buffered, which are given by pairs of start and end times, are, in (non-chronological) order: 60-120; 240-300; 300-310; 20-60; 310-360.

In one aspect, the values for "bufferArray" can be specified, e.g., hard-coded, in the Web page that is received from the media server and rendered by the client system, e.g., presented upon a display. In that case, the buffering of segments in the specified order can be started automatically from the media server or responsive to a client system request with the ordering specified by "bufferArray".

In another aspect, the values for "bufferArray" can be determined by the client system. For example, the historical playback data for the media file can be provided as part of the page or embedded within the actual media file. The client system, having loaded the page, can detect the parameter "&buffer". Responsive to detecting the parameter, the client system determines a segment ordering for buffering as discussed within this specification. The client system, for example, determines the values for "bufferArray" to specify the determined ordering. As discussed with reference to the media server, the values determined for "bufferArray" can be determined by the client system based only upon historical playback data or a combination of user-specific data stored in the client system and the historical playback data, thereby resulting in a user-specific segment ordering for buffering. The values can be provided to the media server, for example, automatically once determined, responsive to the user selecting the link for the media file, as a background process, or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer-implemented method within a client system that is operably connected to a server system, comprising:
    forwarding, to the server system and from a browser within the client system, a single request that includes a parameter and identifies a plurality of segments to be buffered; and
    receiving, from the server system, the identified plurality of segments in a non-chronological order, wherein
    the parameter indicates that non-chronological buffering is permitted, and
    the browser is configured to render a markup language file including a media file reference having the parameter.

2. The method of claim 1, wherein
    the non-chronological order is specified in the markup language file.

3. The method of claim 2, wherein
    the non-chronological order is based upon historical playback data for the media file.

4. The method of claim 1, wherein
the non-chronological order is determined by the client system.

5. The method of claim 4, wherein
historical playback data for the media file is used by the client system to determine the non-chronological order.

6. The method of claim 4, wherein
the non-chronological order is based upon profile data associated with a user of the client system.

7. The method of claim 4, wherein
a combination of profile data associated with a user of the client system matched with historical playback data for the media file is used to determine the non-chronological order.

8. A client system that is operably connected to a server system, comprising:
a hardware processor configured to initiate the following executable operations:
forwarding, to the server system and from a browser within the client system, a single request that includes a parameter and identifies a plurality of segments to be buffered; and
receiving, from the server system, the identified plurality of segments in a non-chronological order, wherein
the parameter indicates that non-chronological buffering is permitted, and
the browser is configured to render a markup language file including a media file reference having the parameter.

9. The client system of claim 8, wherein
the non-chronological order is specified in the markup language file.

10. The client system of claim 9, wherein
the non-chronological order is based upon historical playback data for the media file.

11. The client system of claim 8, wherein
the non-chronological order is determined by the client system.

12. The client system of claim 11, wherein
historical playback data for the media file is used by the client system to determine the non-chronological order.

13. The client system of claim 11, wherein
the non-chronological order is based upon profile data associated with a user of the client system.

14. The client system of claim 11, wherein
a combination of profile data associated with a user of the client system matched with historical playback data for the media file are used to determine the non-chronological order.

15. A computer program product, comprising:
a hardware storage device have stored therein program code,
the program code, which when executed by a client system operably connected to a server system, causes the client system to perform:
forwarding, to the server system and from a browser within the client system, a single request that includes a parameter and identifies a plurality of segments to be buffered; and
receiving, from the server system, the identified plurality of segments in a non-chronological order, wherein
the parameter indicates that non-chronological buffering is permitted, and
the browser is configured to render a markup language file including a media file reference having the parameter.

16. The computer program product of claim 15, wherein
the non-chronological order is specified in the markup language file.

17. The computer program product of claim 16, wherein
the non-chronological order is based upon historical playback data for the media file.

18. The computer program product of claim 15, wherein
the non-chronological order is determined by the client system.

19. The computer program product of claim 18, wherein
historical playback data for the media file is used by the client system to determine the non-chronological order.

20. The computer program product of claim 18, wherein
the non-chronological order is based upon profile data associated with a user of the client system.

* * * * *